Jan. 13, 1959     G. H. BUSHWAY     2,868,112
COOKING MACHINE

Filed May 13, 1955     2 Sheets-Sheet 1

INVENTOR.
GEORGE H. BUSHWAY
BY
Kenway, Jenney, Witter & Hildreth
ATTORNEYS

Jan. 13, 1959  G. H. BUSHWAY  2,868,112
COOKING MACHINE
Filed May 13, 1955  2 Sheets-Sheet 2

INVENTOR.
GEORGE H. BUSHWAY
BY
Kenway, Jenney, Witter & Hildreth
ATTORNEYS

United States Patent Office 2,868,112
Patented Jan. 13, 1959

2,868,112

COOKING MACHINE

George H. Bushway, Rye Beach, N. H.

Application May 13, 1955, Serial No. 508,193

3 Claims. (Cl. 99—410)

This invention relates to cooking machines of the nature shown in Patent 2,215,929, commonly called deep fat fryers and adapted to cook various edible products in an oil bath. The machine employs a cooking tank together with a foraminous basket for supporting the product within the bath. The bath is heated electrically and the machine can be constructed to operate either manually or automatically. Such machines under thermostatic control are known in the art, and the primary object of my invention resides in the production of a cooking machine of this nature having improved and more compact and economical features of construction and operation.

These and other features of the invention will be more readily understood and appreciated from the following detailed description of a preferred embodiment thereof, selected for purposes of illustration and shown in the accompanying drawings in which—

Figure 1:
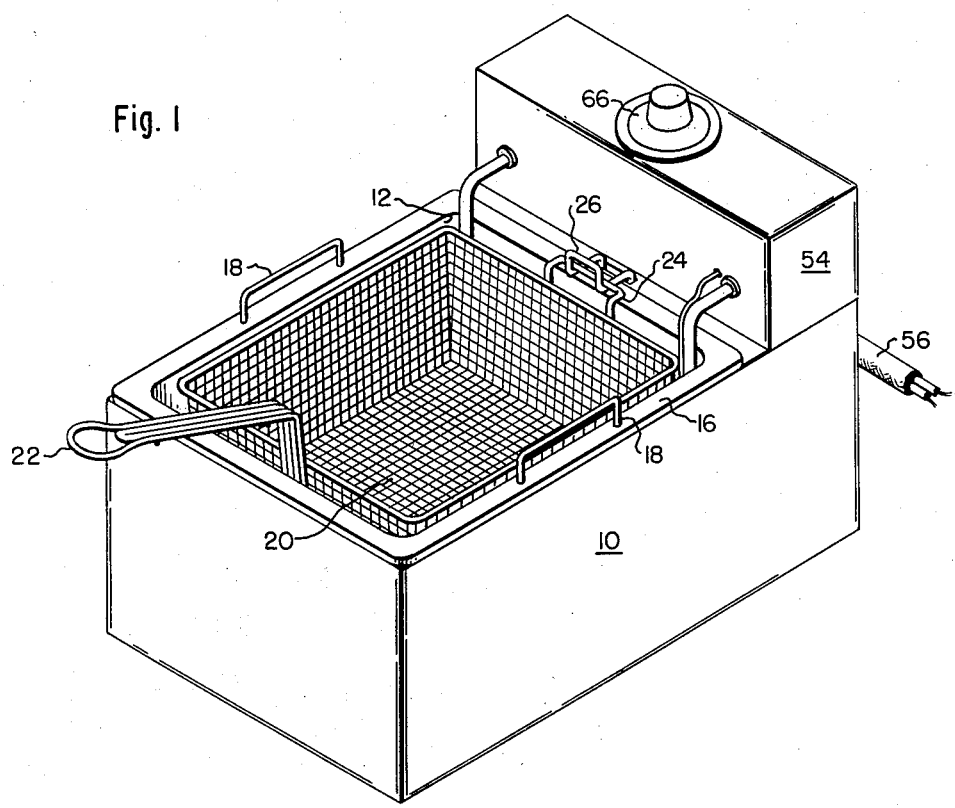
Fig. 1 is a perspective view of a cooking machine embodying the invention.

In the drawings 10 indicates a box-like casing preferably of sheet metal and open vertically therethrough to receive thereinto a cooking tank 12. The tank substantially corresponds in size and shape to the top opening 14 to slide vertically therein and is provided with an outwardly extending marginal rim 16 adapted to rest on the casing at the margin of the opening to support the tank within the casing. Lifting handles 18 are provided on the tank.

A foraminous basket 20 of a size and shape to fit within the tank is provided for receiving and supporting products to be cooked. A lifting handle 22 is affixed to one side of the basket and a supporting loop 24 is fixed to the top margin at the opposite side. The loop is adapted to be engaged over a member 26 for supporting the basket on the casing and within the tank.

The member 26 illustrated in the drawing comprises a wire loop having two relatively long legs 28 extending downwardly within a vertical guide 30 housed within the casing adjacent to the opening 14. A partition 32 adjacent to the guide within the casing provides a chamber 34 for housing an electric motor 36. Mechanism including a shaft 38 extending through the partition from the motor is adapted to raise the member 26—28. This mechanism comprises a crank 40 on the shaft and connected by a link 42 to a block 44 riding in the guide beneath the bottom end of the legs 28.

Figure 2:
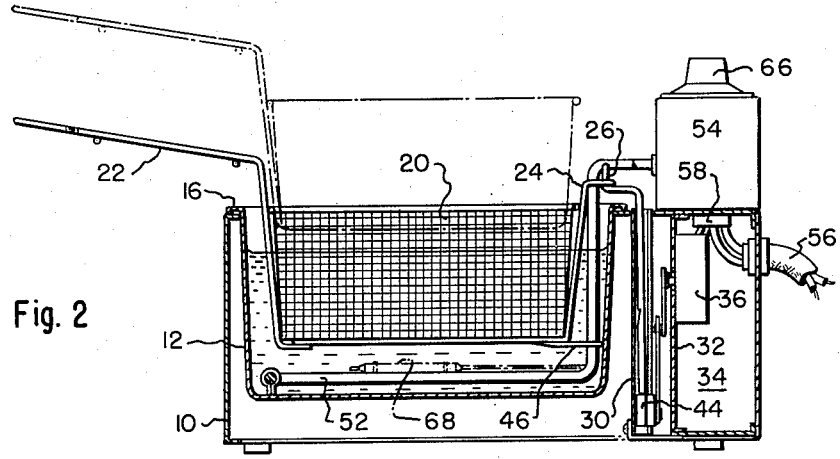
Fig. 2 is an elevation of the machine mostly in vertical section.
Figure 3:
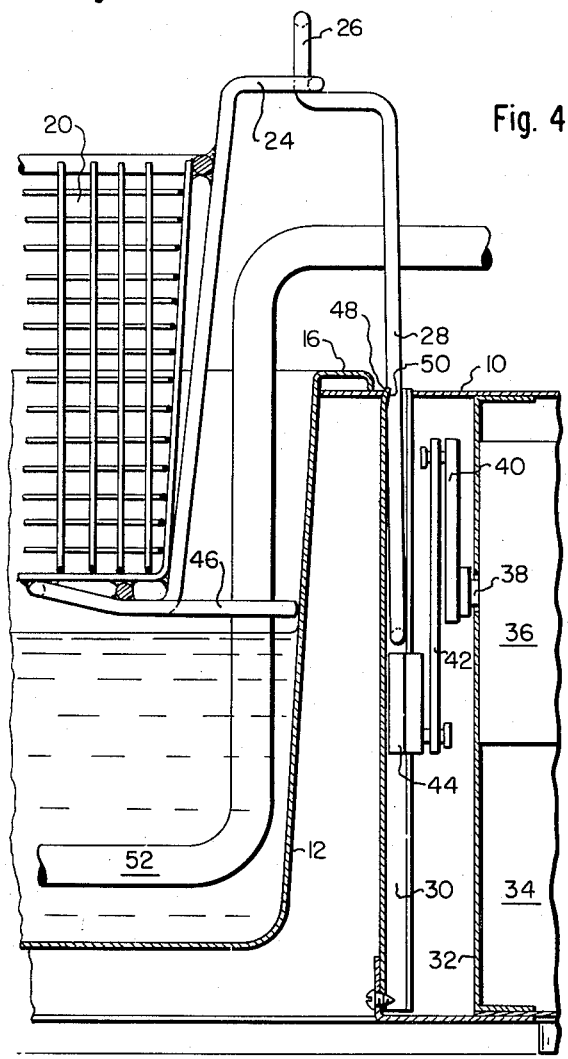
Fig. 3 is an enlarged fragmentary view of Fig. 2 with the parts in raised position.

When the block 44 and member 26—28 are in the down position of Fig. 2, the member is adapted to support the basket 20 in cooking position within the tank. A U-shaped loop affixed to the bottom of the basket has two legs 46 extending outwardly beneath the loop 24 and cooperating therewith and with the side of the tank to support the basket horizontally on the member 26 with the basket centered within and in equally spaced relation from the walls of the tank as illustrated in Fig. 2. Upon rotation of the motor the block 44 engages and lifts the legs 28 and elevates the basket to a position above the cooking liquid. In such position the weight of the basket holds the member 26—28 to the latched position illustrated in Fig. 3 wherein a margin 48 of the guide is engaged within notches 50 in the legs 28. The basket is thus supported in draining position above the cooking liquid independently of the motor.

Figure 4:
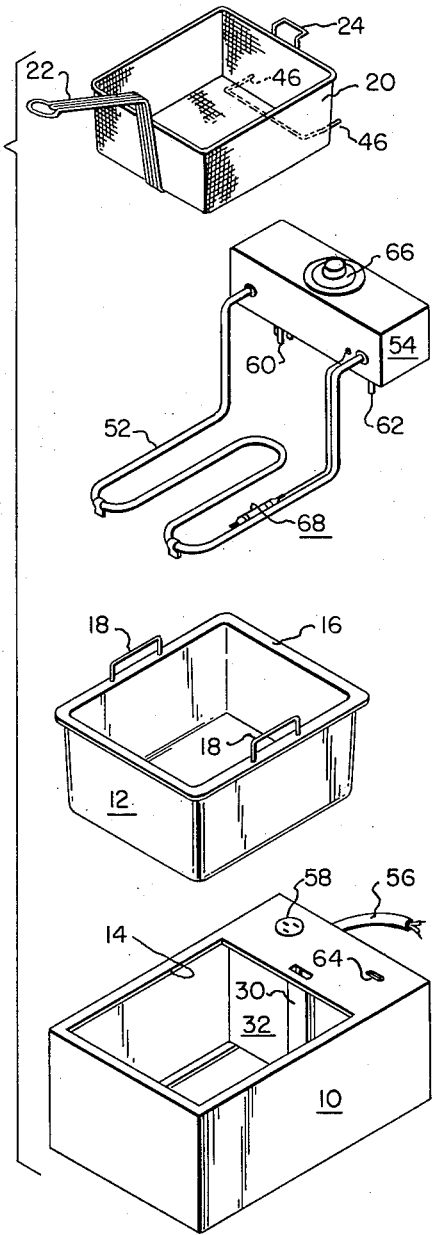
Fig. 4 is a view of cooperating parts in disassembled relation.

The cooking liquid in the tank is heated electrically by a heating unit 52 shown in Fig. 4. The unit is mounted on a control box 54 in position to extend into the tank beneath the basket 20 when the control box is seated on the casing over the motor chamber 34. An electric power cable 56 extends into the chamber 34 to a terminal socket member 58 flush with the top wall of the casing and suitable wiring is provided therefrom to the motor 36 and heater 52 through control mechanism within the box. The control box carries electric terminals 60 for engaging within the socket and a locating pin 62 for engaging within a hole 64. The mechanism within the box 54 is under the control of a thermostat 68 carried by the heater 52 and is adapted to function automatically substantially as described in said Patent 2,215,929. A graduate dial is provided at 66 for setting the thermostat to the cooking temperature desired.

At the start of the cooking operation the parts are in the position of Fig. 2. When the cooking is completed the thermostat automatically cuts off the heat and starts the motor which thereupon raises the basket to the draining position of Fig. 3. The parts remain in this position ready to perform the next cooking operation.

It will be apparent that my invention provides a substantially improved and more compact construction and one in which the several parts can be readily disassembled for easy washing and cleaning as shown in Fig. 4.

Having thus disclosed my invention what I claim as new and desire to secure by Letters Patent is:

1. A cooking machine comprising a sheet metal box-like casing, a vertical partition dividing the casing into two chambers, one chamber being covered by the top wall of the casing and the other chamber having an opening through the top wall, a cooking tank removably disposed within the opening and extending downwardly into said other chamber, a foraminous basket removably disposed within the tank, means connected to the basket and including an electric motor in the covered chamber and a shaft extending through the partition for lifting the basket, an electric terminal socket in said top wall of the casing, a control box seated on said top wall and having electric terminals removably extending into the socket, and an electric heating unit carried by the control box in position extending downwardly into the tank beneath the basket when the control box is thus seated on the top wall, the control box containing means for energizing the heater and motor and the control box and heating unit being removable from the casing as a unit, and the partition permitting thorough washing and cleaning of said other chamber without exposing the means including the motor in the said one chamber.

2. The cooking machine defined in claim 1 in which the means for lifting the basket includes a basket supporting member slidable longitudinally and vertically through said top wall and downwardly into the casing and having a notch therein providing a shoulder for engaging the top wall of the casing and supporting the basket in raised position.

3. The cooking machine defined in claim 2 plus a basket supporting member fixed to the basket in position to engage the top end of the basket supporting member, and means fixed to the basket adjacent to its bottom end and extending laterally outward thereof beneath said basket supporting member for engaging the adjacent side wall of the tank and supporting the basket in horizontal position and spaced from said adjacent side wall of the tank.

References Cited in the file of this patent

UNITED STATES PATENTS

| | | |
|---|---|---|
| 2,019,170 | Barlow | Oct. 29, 1935 |
| 2,196,968 | Bemis | Apr. 16, 1940 |
| 2,215,929 | Husk | Sept. 24, 1940 |
| 2,244,168 | Miller | June 3, 1941 |
| 2,346,628 | Todd | Apr. 11, 1944 |
| 2,448,215 | George | Aug. 31, 1948 |
| 2,630,062 | Litt | Mar. 3, 1953 |
| 2,695,947 | Heerdt | Nov. 30, 1954 |
| 2,756,321 | Pappas | July 24, 1956 |

FOREIGN PATENTS

| | | |
|---|---|---|
| 315,984 | Great Britain | July 25, 1929 |